Nov. 12, 1946.   T. J. BELL   2,410,861
CELERY HARVESTING APPARATUS
Filed April 8, 1944   7 Sheets-Sheet 2
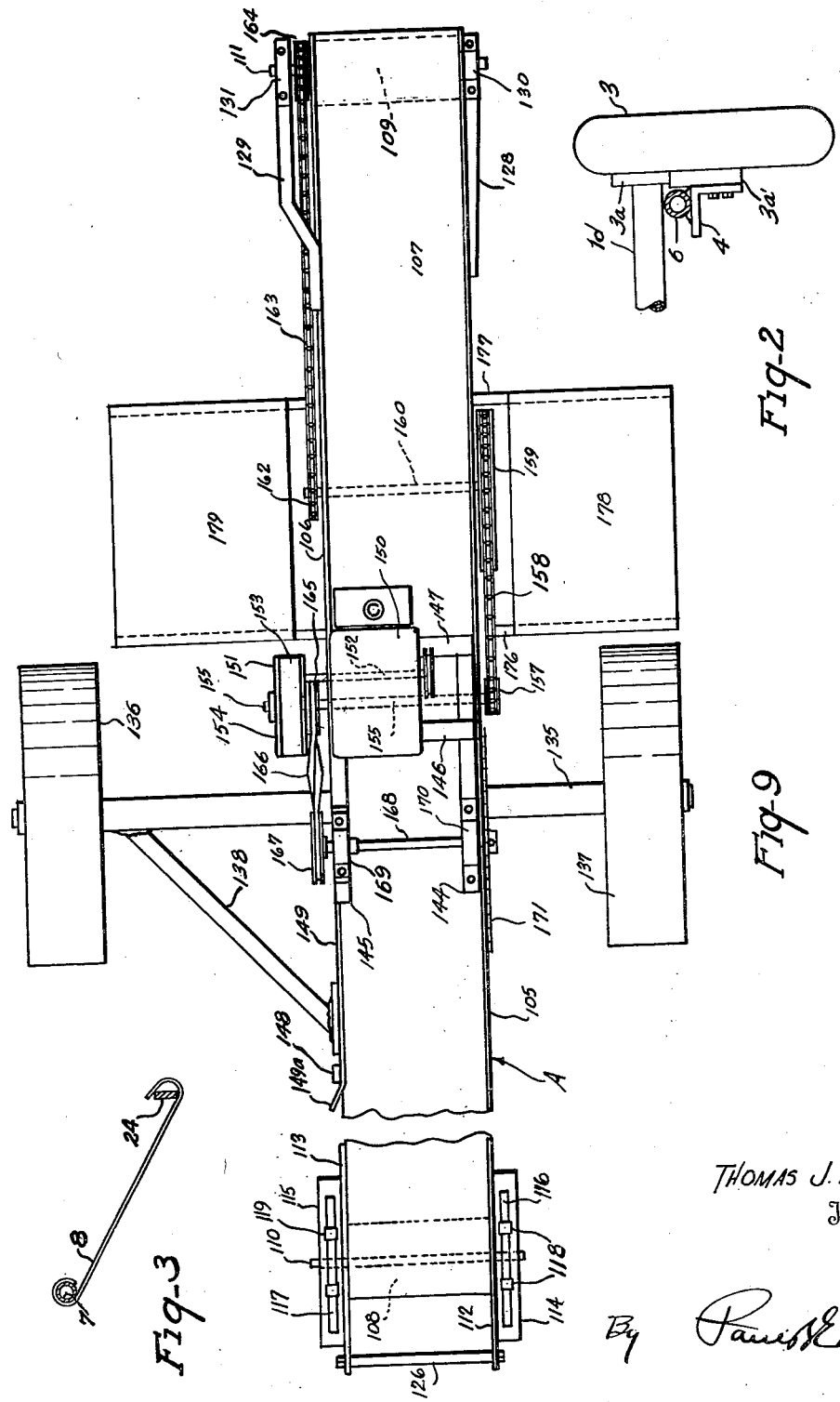

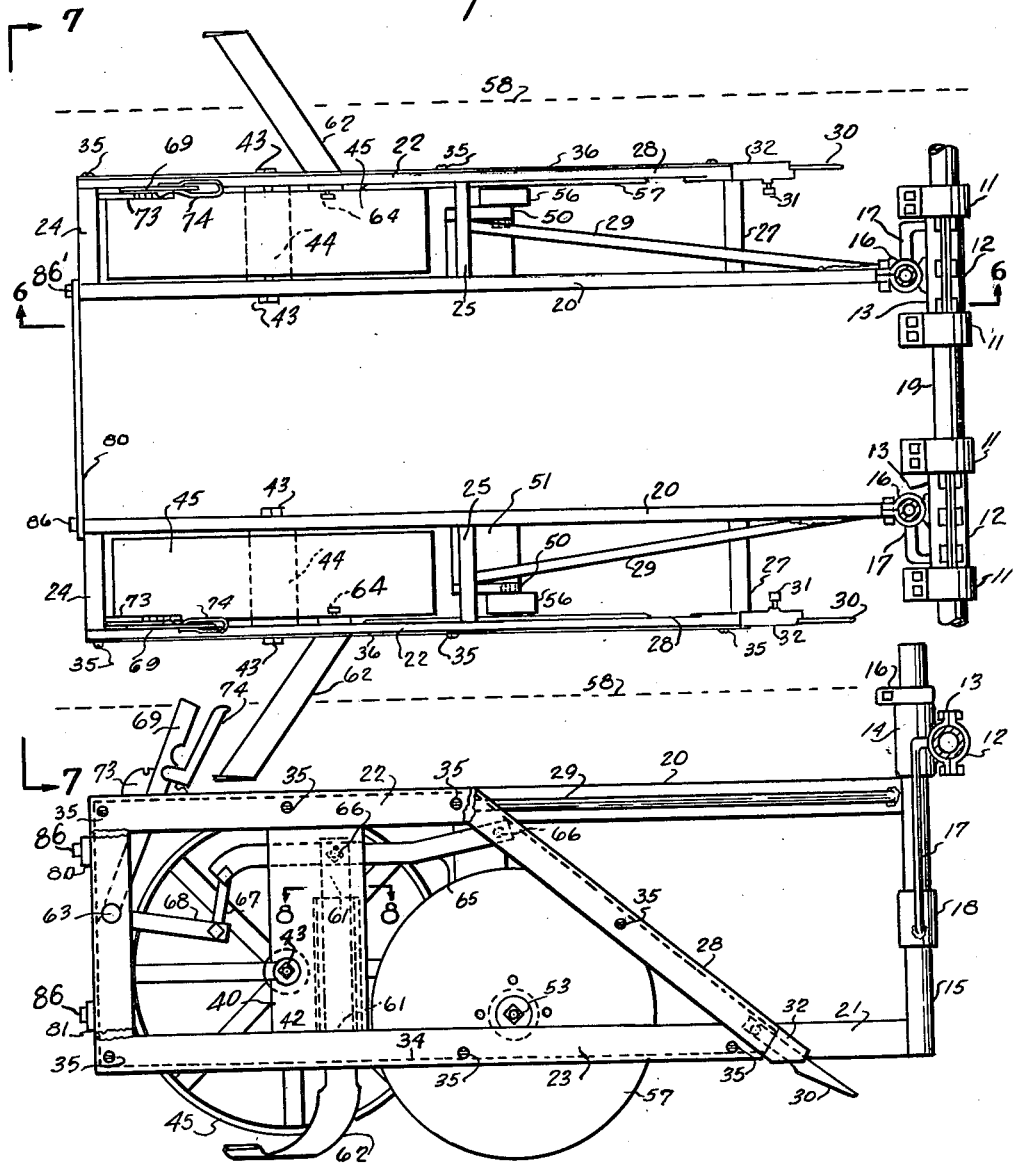

Nov. 12, 1946. T. J. BELL 2,410,861
CELERY HARVESTING APPARATUS
Filed April 8, 1944 7 Sheets-Sheet 4

THOMAS J. BELL
Inventor

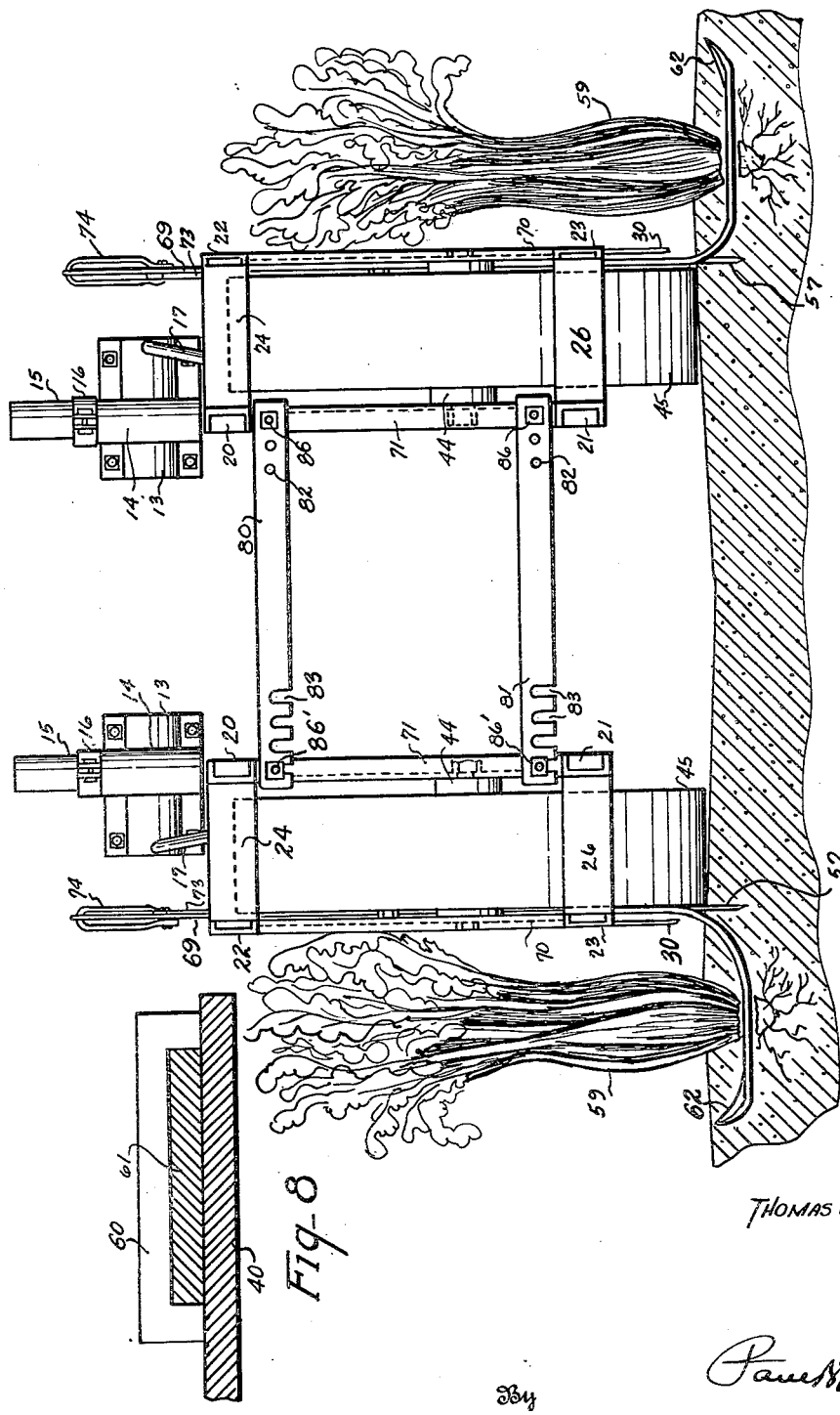

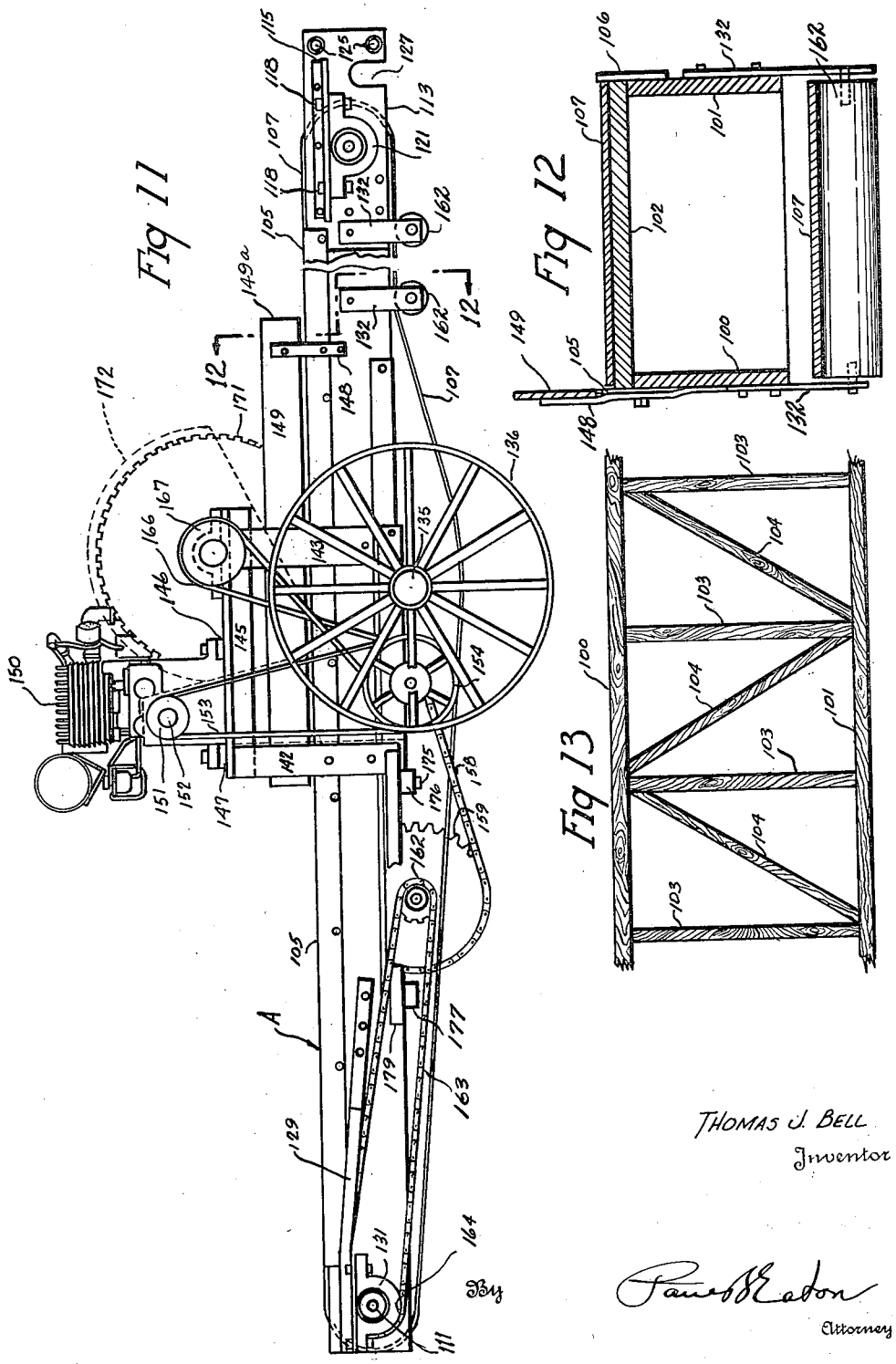

Patented Nov. 12, 1946

2,410,861

UNITED STATES PATENT OFFICE 2,410,861

CELERY HARVESTING APPARATUS

Thomas J. Bell, near Sarasota, Fla.

Application April 8, 1944, Serial No. 530,106

5 Claims. (Cl. 55—9)

This invention relates to a celery harvesting apparatus and more especially to a suitable framework adapted to be secured to a tractor and to which is adapted to be secured a plurality of cutters to run between the rows of celery to cut the same, followed by a plurality of carriages having endless belts thereon and onto which the cut celery, after being stripped, can be placed which will convey the stalks of celery rearwardly where their butt portions will be aligned against a guide board and as they move rearwardly, the tops will be cut from the celery a predetermined distance from the base portions of the celery, and then the celery stalks will be moved further rearwardly where they will be placed into field boxes and deposited on the ground to be picked up by trucks and transported to the packing houses where they will be further stripped and graded and packed in shipping crates for shipping to the market.

Celery is laid out in definite rows; that is, the rows are usually formed by stretching a wire across the field, and the rows are laid out in practically a straight line, a given number of inches apart. These rows are spaced differently to accommodate spraying machines and the like. For example, one type of spraying machine covers twelve rows of celery and sprays twelve rows of celery at a time; therefore, it is necessary in order to prevent bruising of the celery plants, to have the rows in which the tractor wheels run slightly further apart than the rows along which no object passes in a spraying operation. Furthermore, the spray boom usually has a trusswork extending downwardly in spaced relation to each side of the tractor for lending rigidity to the boom. These middles between the rows where this trusswork of the spray boom passes are also slightly wider than some of the other middles so as to prevent this trusswork from bruising the celery plants as the spraying apparatus is passed over the field. In one locality, the rows are spaced with middles as follows: between the outside row next to the irrigation ditch bank and the next succeeding row, 30 inches, the next middle, 30 inches, the next middle, 30 inches, the following middle, 32 inches for accommodating the trusswork of the spray boom, the next middle, 38 inches to accommodate one of the tractor wheels, the next middle, 30 inches which is substantially underneath the middle portion of the tractor, the next middle, 38 inches to accommodate the other wheel of the tractor, the next middle, 32 inches for accommodating the other trusswork of the spray boom, the next three middles, 30 inches apart, making in all eleven middles between the twelve rows of celery which are covered by one sweep of the spraying apparatus. Therefore, in providing a celery cutter for cutting two rows of celery at a time, it is necessary to have the width of the frame adjustable as to overall width so as to take care of the different widths of middles of celery and to properly cut the rows of celery regardless of the width therebetween.

The various types of celery cutters hereinafter shown and described are adapted to be drawn by attaching several of these cutters to a transversely disposed boom or draw bar mounted on a tractor so as to have alternate middles provided with a cutter so that several rows of celery can be cut at one trip across the field. Another draw bar is provided behind the tractor and to which a plurality of carriages or conveyers having endless belts thereon are releasably attached for conveying the celery rearwardly to where the tops are cut, and it is later packed into field boxes to be hauled away from the field to the packing house where additional stripping, grading, and like operations are carried out, and the celery is then packed into shipping crates for shipment to the market.

It is therefore an object of this invention to provide a celery harvester comprising a framework secured to a tractor and comprising a pair of transversely disposed draw bars, one of which is for pulling cutting mechanisms between the rows of celery for cutting the same and the other of which is adapted to have secured thereto a plurality of trailing carriages or conveyers having endless belts thereon for conveying the celery rearwardly after it is placed thereon by being lifted from the ground. On said cariages or conveyers, suitable cutting implements are provided for cutting off the tops of the celery. The bunches move rearwardly on the carriages or conveyers and are packed into field boxes for transport to the packing houses for further operations.

It is another object of the invention to provide a celery cutter and harvesting mechanism for cutting a plurality of rows of celery at the same time and then having a crew deposit the cut stalks of celery onto suitable conveyers where the tops are cut from the celery and the stalks are packed into suitable shipping boxes carried by the carriages or conveyers as they are drawn over the field.

Some of the objects of the invention having been stated, other objects will appear as the description proceeds, when taken in connection with the accompanying drawings, in which:

Figure 2 is an enlarged detail view taken along the line 2—2 in Figure 1;

Figure 3 is an enlarged detail view taken along the line 3—3 in Figure 1;

Figure 4 is a top plan view of one of the celery cutters;

Figure 5 is a side elevation of the cutter looking from the lower side of Figure 4;

Figure 7 is a rear elevation taken along the line 7—7 in Figure 4;

Figure 8 is a sectional view taken along the line 8—8 in Figure 5;

Figure 9 is a top plan view of carriage A showing the front portion thereof broken away;

Figure 11 is a reverse view of Figure 10;

Figure 12 is a vertical sectional view taken along the line 12—12 in Figure 11;

Figure 13 is a bottom plan view of a portion of the carriage frame.

Figure 1:
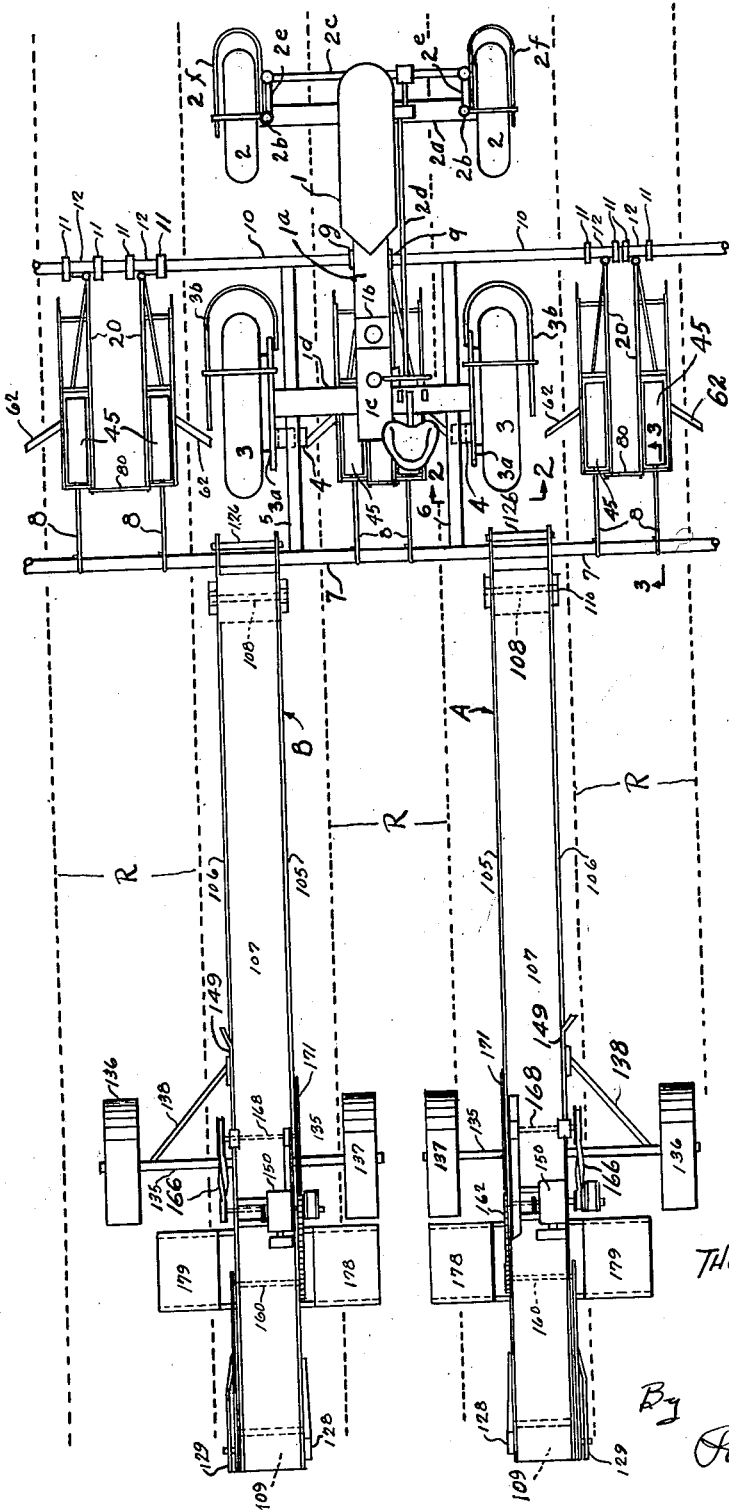
Figure 1 is a top plan view showing, partly in schematic form, the cutters attached to a tractor and the carriages also trailing behind the tractor.
Figure 6:
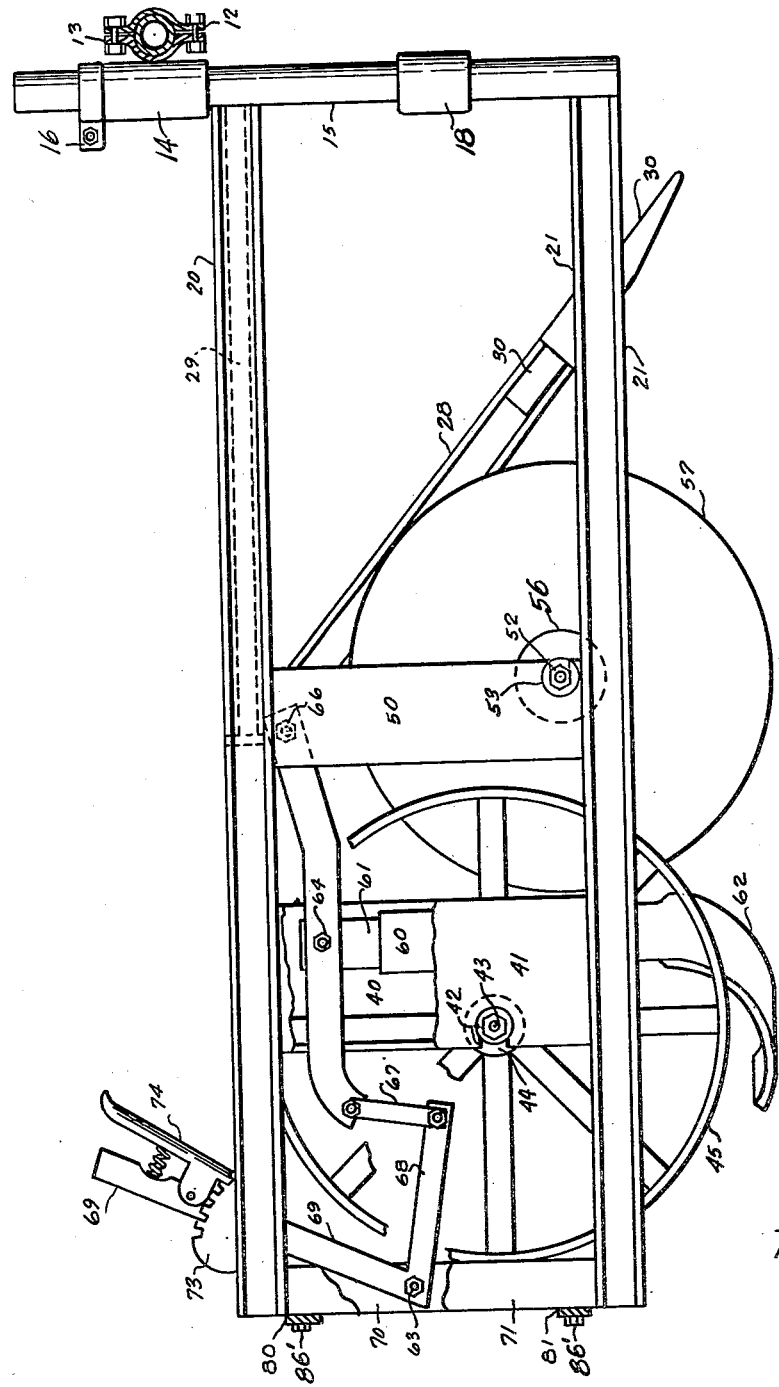
Figure 6 is an elevation taken along the line 6—6 in Figure 4.
Figure 10:
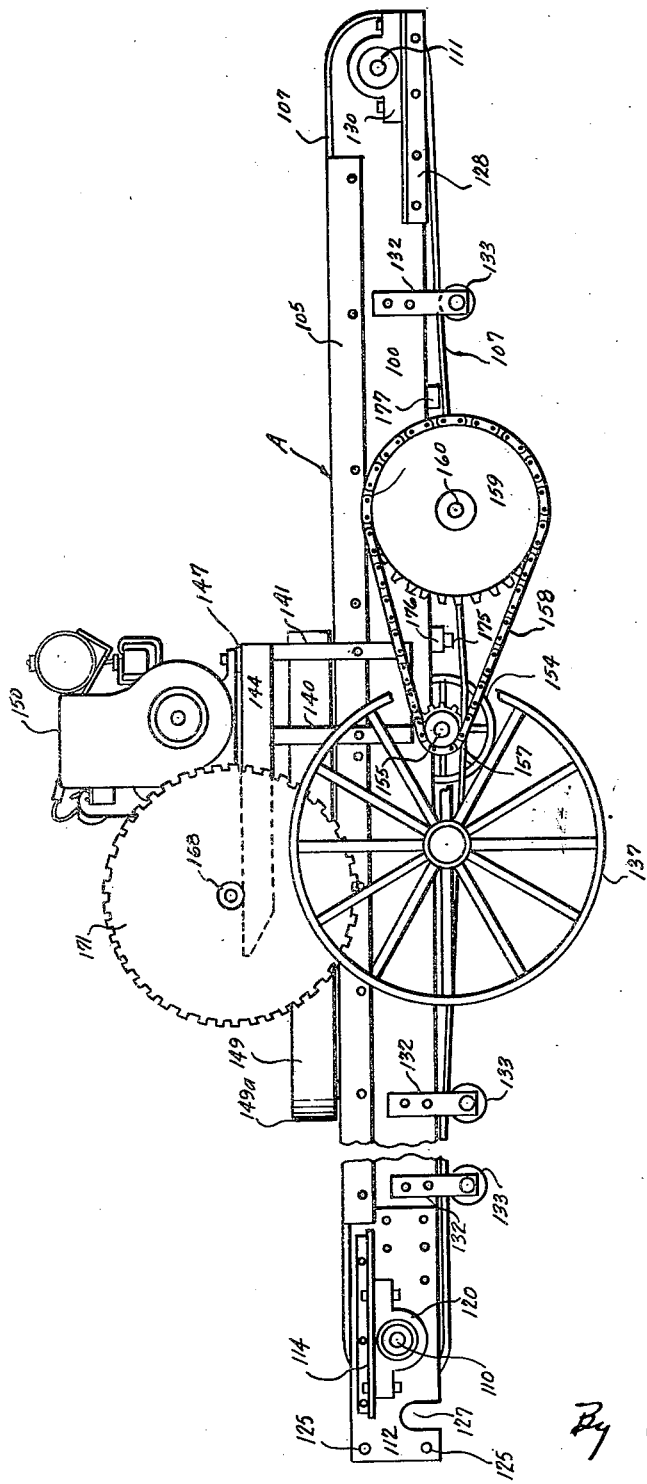
Figure 10 is a side elevation of carriage A looking from the lower side of Figure 9.

Referring more specifically to the drawings, the numeral 1 indicates a tractor having a longitudinally disposed center portion 1a with a pair of change gear transmissions 1b and 1c disposed between the engine of the tractor and the axle mechanism disposed in axle housing 1d. These two change gear transmissions permit the tractor to move very slowly, say about 1,000 feet per hour, to thus give time to the crew to take care of the celery as fast as it is cut. The tractor has front wheels 2, pivotally mounted to the front axle 2a as at 2b which are directed by a suitable steering mechanism indicated by reference characters 2c and 2d. Secured to the pins 2b and cranks 2e are guards 2f for preventing the wheels from bruising the rows of celery as they pass between the rows of celery. The tractor has rear wheels 3, and the axle 1d has suitable flanges or hub portions 3a and 3a' to which is secured a suitable cowling 3b for preventing the wheels 3 from bruising the rows of celery. Secured by any suitable means such as bolts to the flanges 3a' of the rear axle are angle brackets 4 to which are secured as by welding pipes 5 and 6. To the rear end of pipes 5 and 6 is a draw bar 7 having hooks 8 pivotally secured therearound, which hooks 8 have a hooked front portion which is adapted to hook beneath one of the rear transverse frame portions of the cutters to be hereinafter described for holding the cutters in elevated position when they are not in operation. These cutters to be hereinafter described are secured to a transverse draw bar 10 which is welded or otherwise secured to the front ends of the bars or pipes 5 and 6. The center portion of this front draw bar 10 is secured to the portion 1a of the tractor by any suitable means such as strap members 9 being secured to the bar 10 and to the tractor portion 1a.

As previously described, the draw bar 10 extends transversely of the tractor, and to which a plurality of cutter frames are adapted to have their front end secured by any suitable means, but in the drawings I have shown the draw bar 10 as having a plurality of cuffs 11 adjustably mounted thereon for confining the cutter frames in proper position. Loosely secured around the draw bar 10 is a pair of semi-circular cuff members 12 and 13, and to each cuff member 13 is welded a short pipe 14 in which is mounted a vertically disposed pipe 15 in a loose manner so as to permit oscillation of the pipe 15 within the pipe 14. A clamp 16 surrounds the upper end of the pipe 15 to limit downward movement of the front end of the frame.

Also secured to the cuff member 13 is a brace pipe 17 which is welded to cuff member 13 and extends downwardly and is secured by welding or otherwise to a short pipe member 18 which likewise is loosely mounted on the pipe 15.

Each of the two frames are identical except they are opposite hand, and therefore, a description of one of the frames will equally apply to the other frame. The cutter frames in Figures 4 to 7 inclusive are shown and described in my co-pending applications, Serial No. 528,259, filed March 27, 1944, and Serial No. 594,494, filed May 18, 1945.

Each frame comprises an upper bar 20 and a lower bar 21 both welded to the pipe 15. These are called the inner bars of the frame, and the frame also has outer bars 22 and 23, the upper outer bar 22 being secured as by welding to cross bars 24 and 25. The lower bar 23 is connected to cross bars 26 and 27. Secured between cross bar 25, and the forward portion of top bar 20 is a brace bar 29. Between the forward ends of the outer bars 22 and 23, there is disposed, as by welding, a sloping bar 28 which has adjustably mounted in its lower forward end an adjustable finger 30 by means of a set screw 31. On the exterior of the lower end of sloping bar 28, there is a cuff 32. A sheet metal cowling member 34 has the exterior edges thereof indicated by dotted lines 34, and is adapted to be secured in position by means of a plurality of screws 35. This cowling is omitted in all of the drawings except in Figure 4 where the top edge of the same is shown and is indicated by reference character 36.

Disposed between the upper bars 22 and the lower bars 23 is a plate member 40 and also disposed between the upper bar 20 and the lower bar 21 is a plate member 41. These plate members each have suitable notches 42 therein in which a bolt 43 is mounted which penetrates a hub 44 of a ground wheel 45.

Welded to the cross bar 25 and extending downwardly is a bar 50 whose lower end is welded to a cross bar 51, and in this bar 50 is a notch 52 in which a bolt 53 is confined, this bolt being the bearing spindle of a suitable bearing 56 which has fixedly secured thereto a disk colter 57.

Vertically disposed and secured to plate 40 by any suitable means such as by welding is a guide member 60 having slidably mounted therein a shank 61 of a cutting blade 62. This cutting blade 62 projects outwardly and rearwardly from the side of the frame for cutting celery stalks 59 immediately below the junction point of the leaves thereon and sufficiently high as to cut a minimum of the ground roots of the celery so as to minimize the stripping operation. The rows of celery 58 are indicated by dotted lines in Figure 1. The celery stalks must be cut low enough to prevent the leaves falling apart, and yet high enough as to prevent any undue amount of roots being left on the celery stalks.

The upper end of the shank 61 has pivotally secured thereto as at 64 a link 65 which is pivoted at its forward end as at 66 to the inner surface of the sloping bar 28. To the rear end of the bar 65, there is pivotally mounted one end of a link 67, the lower end of link 67 being pivotally connected to a leg 68 which is rigidly connected to and forms a part of a lever 69 pivotally mounted as at 63 to the inner surface of a vertically disposed post 70 secured between the upper bar 22 and the lower bar 23. A similar post 71 is disposed between and secured to the upper and lower bars 20 and 21.

To the inner surface of the transverse bar 24, there is secured a quadrant 73 which projects forwardly in spaced relation to the top bar 22, and at its front end is bent inwardly and connected to the bar 22, thus providing a slot in which the lever 69 is adapted to have movement. This lever has pivoted on the upper end thereof a suitable pawl 74 for holding the lever in adjusted position.

It is thus seen that by adjusting the lever 69 along the quadrant 73, the vertical position of the cutter 62 can be easily adjusted while the machine is in operation.

Pivotally secured on bolts 86 disposed in one of the upright bars 71 are links 80 and 81. These links 80 and 81 each have a plurality of holes 82 adapted to be penetrated by the bolts 86. The other ends of the bars 80 and 81 have notches 83 therein which fit over bolts 86' in the inner upright bar 71 of the other cutter frame.

In operation, a plurality of these cutters are secured to the elongated transversely disposed draw bar 10 secured to a tractor, and the frames are adjusted relative to each other as to suit the width of the middle being traversed by the frames. The finger 30 is adjusted relative to the ground to cause it to pick up the green leaves of celery which might be fallen partially toward the ground and raise them upwardly, and direct them over the front edge of the sloping bar 28 and to the exterior of the cowling 36 disposed on the exterior of the frame. However, the finger 30 is not adjusted close enough to the ground to pick up the dead leaves which have fallen downwardly onto the ground, and these are allowed to pass rearwardly and to be severed by the colter disk 57 before the celery stalks are cut by the blades 62.

By means of the individual ground wheel for each frame and the pivotal connection between the frames, it is seen that due to the fact that the cuff members 12 and 13 are loosely mounted on the pipe 11, that each frame can have individual vertical movement relative to the other frame without affecting in any manner the other frame except that it might draw it a fraction of an inch away from the row which it is cutting. This allows each ground wheel which is running close by the row of celery to regulate the depth of cut of the celery stalks by its associated blade. Furthermore, it is to be noted that the point of cutting is at right angles to the lowermost portion of the wheel, so that as the contour of ground changes, the depth of the cutter blades will also change, so as to cut the celery at a predetermined depth below the top of the ground at all times and regardless of the contour of the land.

It is also to be noted that the front cutting edge of each cutter extends upwardly along its shank, so as to cut undesirable leaves and other debris that may lodge against it, and also that this front vertical portion of the shank which is sharpened and merges into the horizontally disposed cutting edge of the blade is sloped in the same manner as the blade, so as to cause the shank and blade to shed any debris which might collect thereon if it should not be cut by the blade, as it will slide off the end of the blades due to their slope rearwardly as they progress outwardly.

Releasably secured to the rear draw bar 7 and in spaced relation to each other are a pair of trailing carriages or conveyers designated broadly by reference characters A and B, said carriages or conveyers being identical in structure, except that one is opposite hand to the other, and a description of one will represent a description of the other as the structure is identical except for its being opposite hand.

Each of the carriages or conveyers A and B comprises an elongated framework made up of side plates or boards 100 and 101 with a top plate or board 102 and with suitable cross pieces 103 and diagonal braces 104, and for a goodly portion of the length of this frame strap iron members 105 and 106 extend for guiding an endless belt 107. The endless belt is mounted at each end of the framework on rollers 108 and 109 fixedly disposed on shafts 110 and 111, respectively. To the front end of side boards 100 and 101, respectively there are secured plates 112 and 113 on which angle brackets 114 and 115 are mounted which are slotted as at 116 and 117 respectively, and penetrating these slots are bolts 118 and 119, respectively, which penetrate bearings 120 and 121 respectively for the shaft 110.

Disposed between the free ends of the plates 112 and 113 are the bolts 125 which have spacer sleeves 126 disposed between the approximate surface of the plates 112 and 113, and the lower edge of each one of the plates 112 and 113 has a notch 127 which is adapted to hook over the draw bar 7 for pulling the carriages over the celery field. This type of connection allows quick disconnection of the carriages from the draw bar 7 at the end of a row when it is desired to turn the tractor into another set of rows and to pull the carriages by hand around and connect them onto the rear draw bar 7 of the tractor. The rear end of the framework has secured thereto brackets 128 and 129 to which are secured bearings 130 and 131 for receiving the shaft 111 of the roller 109.

A plurality of brackets 132 are secured to the exterior surfaces of the side boards 100 and 101 for rotatably supporting a plurality of rollers 133 which rollers are adapted to support the lower portion of the endless belt 107 on its forward travel to the front portion of the carriage. Disposed beneath each of the frames A and B is a transverse axle 135 having wheels 136 and 137 on its ends, and it will be noted that the carriages are mounted, not in the middle of each of the axles, but nearer the wheels 137 than the wheels 136 so as to cause the carriages to be disposed at the proper position relative to the rows of celery and so that these carriages will not be above a row of celery thus interfering with the strippers in the picking of the bunches of celery for stripping and depositing onto the endless belt. This arrangement also permits one to walk between the proximate wheels of the two carriages. The longer portion of each of these axles has a brace 138 welded thereto, and suitably secured to the adjacent side wall of the carriage frame.

Mounted on the exterior surfaces of the side walls 100 and 101 of the carriage is a plurality of uprights 140, 141, 142, and 143. These have secured on the upper ends thereof angle irons 144 and 145 and spanning the distance between these last-named angle bars are bars 146 and 147.

Secured to the bars 142 and 143 and also to a bar 148 is a guide bar 149 which has its front end outturned as at 149a for guiding the celery stalks through the apparatus, the butts of the celery stalks being adapted to be placed on the belt 107 and an operator arranges the celery bunches so their butts will be against the guide bar 149.

Mounted on the transverse bars 146 and 147 is a suitable prime mover such as a gasoline engine 150 which has a pulley 151 secured on the projecting end of its drive shaft 152 and mounted on this pulley 151 is a belt 153 which is also disposed on a pulley 154 mounted on a transverse shaft 155 secured in suitable bearings, not shown, suitably affixed to the lower portion of the carriage framework. This shaft 155 on its other end has a sprocket wheel 157 secured thereon on which a sprocket chain 158 is mounted, which sprocket chain is also disposed on an enlarged sprocket wheel 159 fixed on a shaft 160 which is mounted in suitable bearings, not shown, disposed on the lower portion of the carriage framework. This shaft 160 projects laterally below the carriage framework, and has a sprocket wheel 162 fixed thereon on which a sprocket chain 163 is mounted which is also disposed on a sprocket wheel 164 fixed on the shaft 111 on which roller 109 is fixedly mounted.

The shaft 155 has also secured thereon a pulley 165 on which a belt 166 is mounted which is crossed to give the proper direction of rotation to the cutter or saw presently to be described, and this belt 166 is mounted on a pulley 167 disposed on a shaft 168 mounted in bearings 169 and 170 mounted on the top portion of angle irons 144 and 145.

On one end of the shaft 168 is disposed a saw or rotary cutter 171 for cutting the tops off of the celery plants as they are directed through the apparatus. A suitable guard for the saw or cutter 171 is indicated by dotted lines 172.

Secured beneath the lower edge of the carriage frame by any suitable means such as bolts 175, are bars 176 and 177 which support a pair of platforms 178 and 179 on which field boxes can be placed for packing the celery stalks thereinto after they have passed by the cutter 171 and have reached a point where they can be reached by operators walking slowly along the ground adjacent the carriages or conveyers for picking up the celery stalks and depositing them into the field boxes.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. Celery harvesting apparatus comprising a tractor having front and rear transversely disposed draw bars thereon, a plurality of wheeled frames secured to the front draw bar and having a blade projecting laterally from each side of each frame for cutting adjacent rows of celery, a pair of elongated carriages releasably secured to the rear draw bar and trailing behind the tractor in spaced relation to each other, each carriage having an endless belt thereon for conveying stalks of cut celery which are deposited in side by side relation thereon, means for guiding the stalks of celery through the apparatus, a cutter disposed on each carriage for cutting the tops from the stalks of celery as they move rearwardly, a plurality of platforms secured on the carriage rearwardly of the cutter for supporting boxes into which the celery stalks are adapted to be placed after they have passed by the cutter to have their tops severed therefrom.

2. A celery harvester comprising a tractor, a pair of longitudinally disposed bars secured to the tractor and disposed beneath the rear axle thereof, a transversely disposed front draw bar secured to the front end of the pair of bars and to the tractor, a rear draw bar disposed transversely and behind the tractor and secured to the rear end of said pair of bars, a plurality of means carried by the front draw bar for cutting a plurality of rows of celery, a pair of elongated wheeled frames secured in spaced relation to each other to the rear draw bar, each frame having an endless belt thereon, a prime mover mounted on each elongated frame and being connected to the endless belt for driving the same to propel stalks of celery laid thereon rearwardly of the elongated wheeled frames, a rotary cutter disposed on each of the elongated frames and driven by the prime mover thereon for cutting the tops of celery bunches as they move rearwardly on the endless belt.

3. A celery harvesting apparatus comprising a prime mover provided with a pair of spaced rear wheels, each spaced apart from each other so that each wheel will travel between two adjacent rows of celery, a front transversely disposed draw bar mounted on the prime mover and disposed in front of the said wheels, a rear transversely draw bar secured to the prime mover and disposed to the rear of said wheels, the front draw bar having secured thereto on both vertical and horizontal pivots the front end of a plurality of wheeled frames, each frame being disposed between two rows of celery, each frame having projecting from each side thereof a cutting blade for cutting the adjacent rows of celery, a pair of elongated wheeled frames having their front ends secured to the tractor and having a conveyor disposed thereon for conveying the stalks of celery, deposited transversely and in side-by-side relation thereon, rearwardly of the elongated wheeled frames, means on the elongated wheeled frames for guiding the butt portions of the celery stalks, a rotary cutter on the elongated wheeled frames adapted to sever the top portions of the celery stalks as they pass rearwardly on the conveyor, and a plurality of platforms carried by the elongated wheeled frames onto which field boxes can be placed for packing the stalks of celery therein after their tops have been severed therefrom.

4. Celery harvesting apparatus comprising a tractor having a front and rear wheel, and having a rear axle housing, a pair of pipes secured to the lower portion of the axle housing adjacent the rear wheels and projecting forwardly and rearwardly of the tractor, a transversely disposed front draw bar disposed on the front end of said pipes and a transversely disposed rear draw bar disposed on the rear ends of said pipes, a plurality of wheeled cutter frames adapted to be disposed between two rows of celery, there being one frame between each two rows of celery, means on the front draw bar for pivotally securing the front ends of the frames on both vertical and horizontal pivots for allowing universal swinging movement of the cutter frames relative to the front draw bar, means on the rear draw bar for engaging the rear ends of the frames and holding them in elevated position for transportation purposes, each of the cutter frames having a laterally and rearwardly projecting blade extending from opposed sides thereof for cutting adjacent rows of celery, the cutter frames having their sides in close proximity to the rows of celery and whereby the rows of celery will be pushed away from the frames onto their sides as they are cut by the laterally projecting blades.

5. A structure according to claim 4 in which a plurality of wheeled carriages are disposed behind the rear draw bar and having two ground wheels disposed so as to travel in the path of the cutter frames, each of the carriages having an endless conveyor thereon for conveying stalks of cut celery deposited thereon rearwardly of the carriages, means for securing the front end of the carriages to the rear draw bar, each of the carriages having thereon a vertically-rising guide bar disposed at one side of the conveyor for guiding the butt ends of the stalks of celery rearwardly as they travel along with the conveyor, a rotary cutter disposed on the other side of each conveyor remote from the guide bar for severing the tops of celery as they are conveyed rearwardly, each carriage having disposed rearwardly of the cutter one or more platforms onto which the field boxes can be deposited for packing the cut celery stalks therein as they emerge from the rotary cutter.

THOMAS J. BELL.